United States Patent
Wu et al.

[19]

[11] Patent Number: 5,983,510
[45] Date of Patent: Nov. 16, 1999

[54] THREE-DIMENSIONAL LASER LEVELLING AND ANGLE-CALIBRATING INSTRUMENT WITH MULTIPLE FUNCTIONS

[76] Inventors: Chyi-Yiing Wu; Chih-Hsiung Lin, both of P.O. Box 55-846, Taipei, Taiwan

[21] Appl. No.: 08/917,593

[22] Filed: Aug. 26, 1997

[51] Int. Cl.[6] ............................ G01C 15/12; G01B 11/26
[52] U.S. Cl. .......................... 33/227; 33/286; 33/DIG. 1; 33/DIG. 21
[58] Field of Search .............................. 33/227, 281, 282, 33/283, 285, 286, 290, 291, 370, 371, DIG. 21, DIG. 1

[56] References Cited

U.S. PATENT DOCUMENTS

| | | | |
|---|---|---|---|
| 4,138,826 | 2/1979 | Inge | 33/281 |
| 4,593,475 | 6/1986 | Mayes | 33/371 |
| 4,656,752 | 4/1987 | Wu | 33/399 |
| 5,394,616 | 3/1995 | Claxton | 33/371 |
| 5,505,000 | 4/1996 | Cooke | 33/286 |
| 5,531,031 | 7/1996 | Green | 33/281 |
| 5,575,073 | 11/1996 | Von Wedemayer | 33/370 |
| 5,864,956 | 2/1999 | Dong | 33/227 |

*Primary Examiner*—Christopher W. Fulton

[57] ABSTRACT

A three-dimensional laser levelling and angle-calibrating instrument includes: a stand; a magnetically-attractive laser level having a horizontal bottom attractable on the stand, a vertical wall perpendicular to the horizontal bottom and a first laser illuminator mounted on the laser level for projecting a horizontal laser ray for levelling purpose; and a magnetically-attractive laser angle calibrator having a second laser illuminator and attracted on the vertical wall of the laser level for projecting a vertical laser light line for checking a verticality.

2 Claims, 8 Drawing Sheets

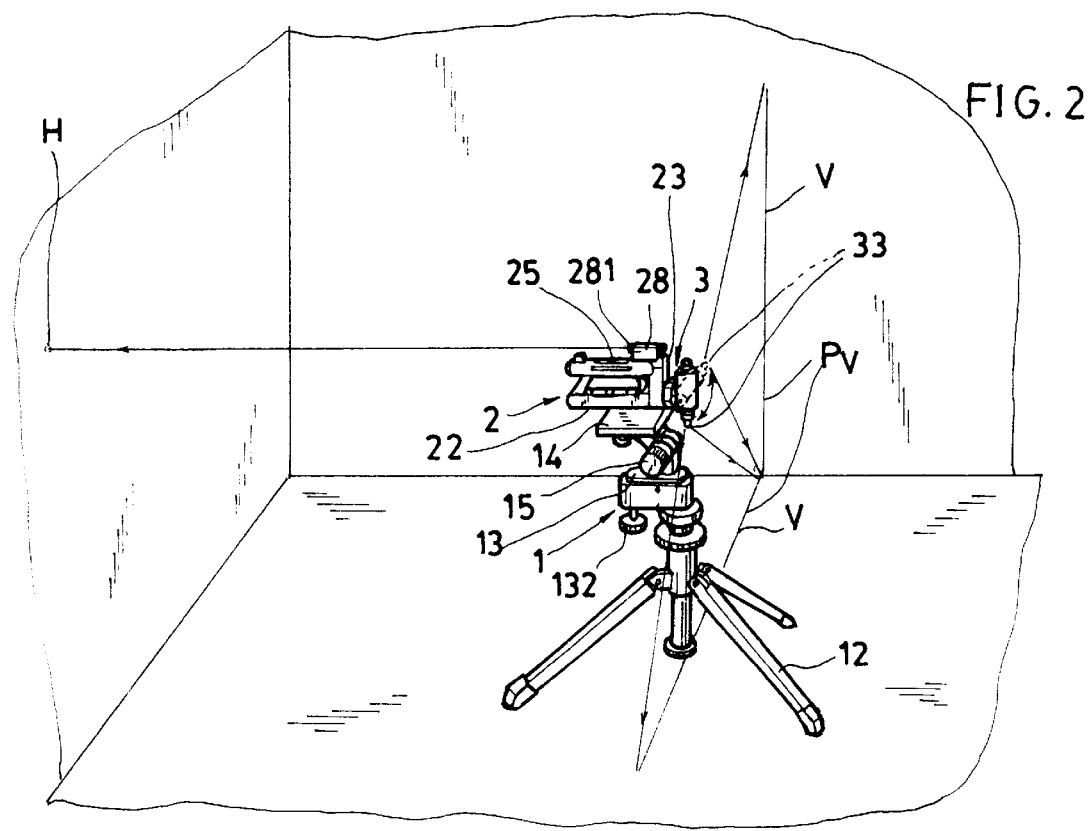
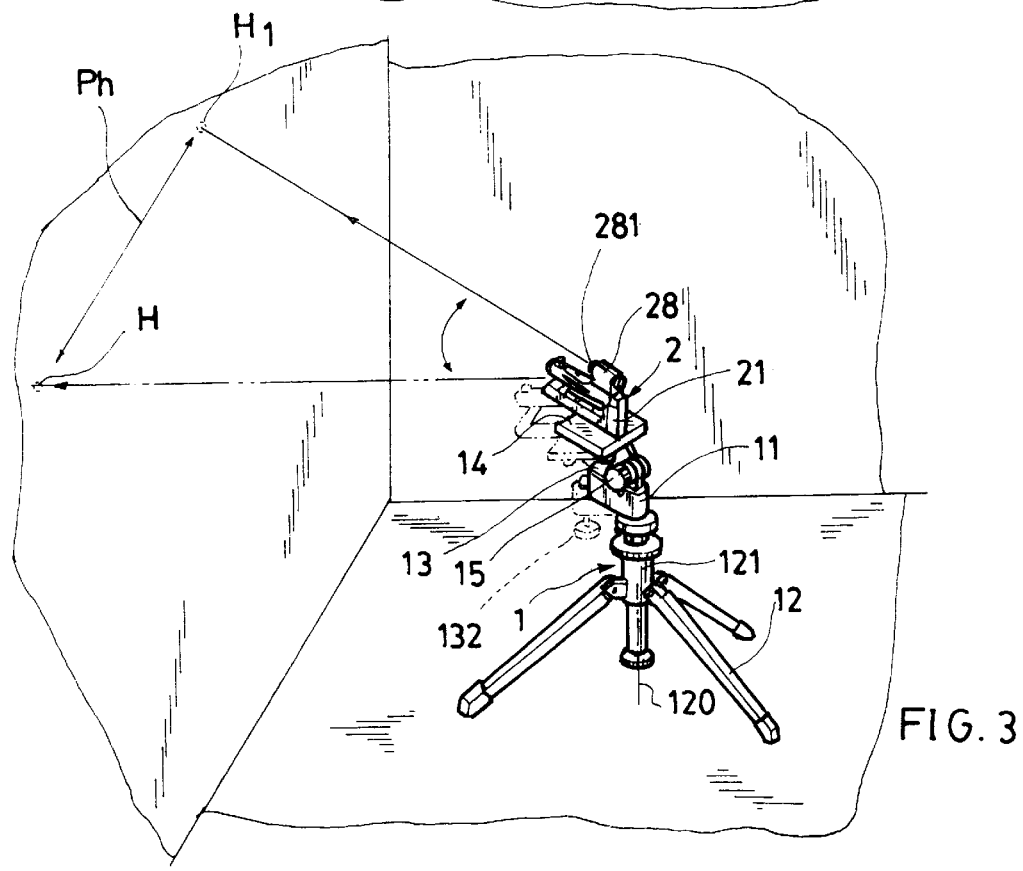

1

THREE-DIMENSIONAL LASER LEVELLING AND ANGLE-CALIBRATING INSTRUMENT WITH MULTIPLE FUNCTIONS

BACKGROUND OF THE INVENTION

For levelling a horizontal plane in engineering construction, a level may be provided for calibrating such a horizontal level. For checking the verticality of a building site, a plumb may be provided for this purpose. It will be costly and inconvenient to purchase and prepare the horizontal level and the vertical plumb separately.

In the circumstances where the levelling and verticality as well as angle calibration must be done simultaneously, such as found in an interior uphostery engineering, to prepare and use the conventional level and plumb separately may defer the engineering work and decrease the job efficiency.

Therefore, the present inventor has invented the device having laser level and angle calibrator combinable on an integrated instrument.

SUMMARY OF THE INVENTION

The object of the present invention is to provide a three-dimensional laser levelling and angle-calibrating instrument including: a stand; a magnetically-attractive laser level having a horizontal bottom attractable on the stand, a vertical wall perpendicular to the horizontal bottom and a first laser illuminator mounted on the laser level for projecting a horizontal laser ray for levelling purpose; and a magnetically-attractive laser angle calibrator having a second laser illuminator and attracted on the vertical wall of the laser level for projecting a vertical laser light line for checking a verticality.

BRIEF DESCRIPTION OF THE DRAWINGS

FIG. 2 is an illustration showing the levelling and verticality calibration as effected by the present invention.

FIG. 3 is an illustration showing a levelling operation in accordance with the present invention.

DETAILED DESCRIPTION

Figure 1:
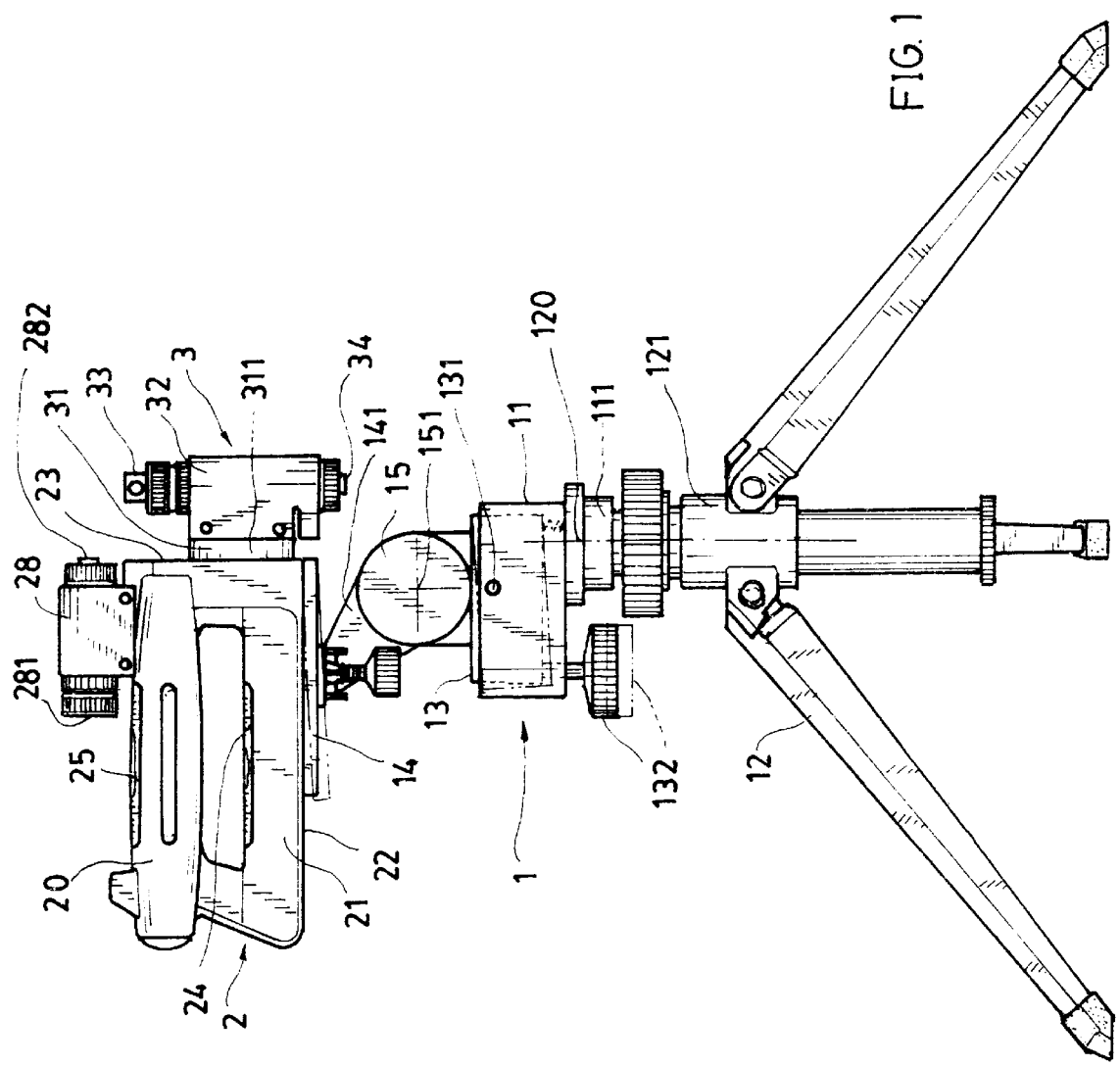
FIG. 1 is an elevational view of the present invention.
Figure 4:
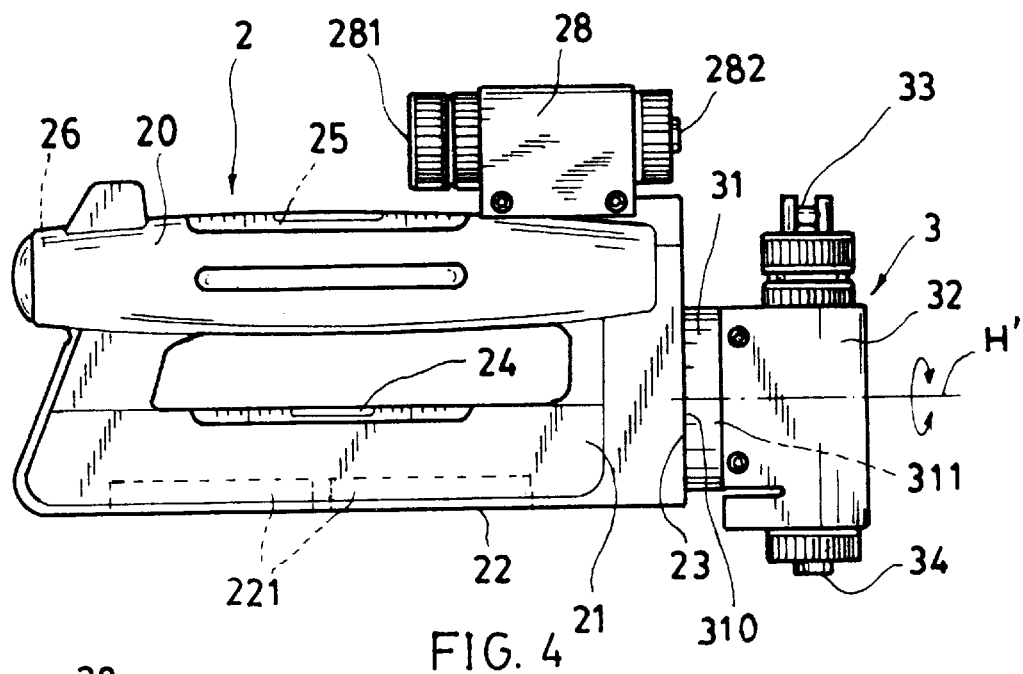
FIG. 4 is an elevational view of the magnetically attractive laser level and the laser angle calibrator of the present invention.
Figure 5:
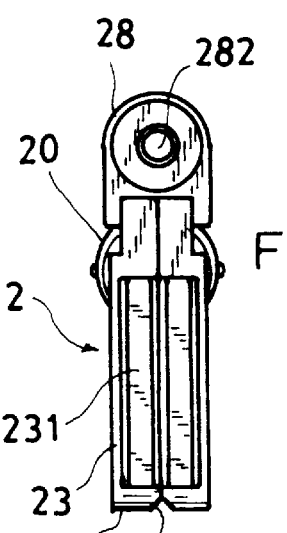
FIG. 5 is a right side view of the laser level as shown in FIG. 4.

As shown in FIGS. 1–6, the present invention comprises: a stand 1, a magnetically attractive laser level 2, and a magnetically attractive laser angle calibrator 3.

2

The stand 1 includes: a rotational holder 11 having a shaft 111 rotatably mounted in a sleeve 121 which is supported on a tripod 12 standing on a ground or a surface and defines a vertical axis 120 in the sleeve 121 for rotating the holder 11 about the axis 120; a platform 14 made of ferrous material having a bracket 141 connectable to an adjusting block 13 through a pivotal joint 15, with the adjusting block 13 pivotally mounted on the rotational holder 11 by a pivot 131 and having an adjusting screw 132 mounted on the holder 11 for adjusting an up-and-down movement of the adjusting block 13 for adjusting the horizontal level on the platform 14 since the block 13 is connected to the platform 14 through the bracket 141 and the joint 15. The joint 15 may also be rotated about a horizontal axis 151 for tilting the platform 14 in a biasing angle.

The magnetically attractive laser level 2 includes: a level body 21 having a horizontal bottom 22 and a magnet 221 fixed in a V-shaped groove formed in the horizontal bottom 22 to be attracted on the platform 14 of the stand 1, a vertical wall 23 formed on a side wall of the body 21 and being perpendicular to the horizontal bottom 22 and having a magnet 231 fixed in the vertical wall 23 for attracting the magnetically attactive laser angle calibrator 3 on the vertical wall 23, a lower bubble levelling means 24 mounted in a lower portion of the body 21 for indicating a horizon of the laser level 2, an adjustable bubble levelling means 25 mounted in a hollow tube portion 20 formed on an upper portion of the body 21 for adjusting a bubble in the adjustable bubble levelling means 25 for obtaining a reference datum horizonal plane of the horizontal bottom 22 and for obtaining a relative vertical plane of the vertical wall 23 with respect to the horizontal bottom 22, and a first laser illuminator 28 mounted on the body 21 for emitting a laser ray through an orifice 281 formed at a front end of the first laser illuminator 28 with the laser ray being projected horizontally (H) as shown in FIG. 2 upon depressing a switch 282 formed on a rear end of the first laser illuminator 28 and upon adjustment of the platform 14 to be horizontally positioned.

The magnetically attractive laser angle calibrator 3 includes: a magnetic disk 31 having a magnet 311 fixed in the disk 31 to be magnetically attracted on the vertical wall 23 of the laser level 2 and having a flat disk bottom 310 coplanar to the vertical wall 23 and perpendicular to the horizontal bottom 22 of the laser level 2, a longitudinal axis H' defined at a longitudinal center of the disk 31 and perpendicular to the vertical wall 23 of the laser level 2, a second laser illuminator 32 secured on the disk 31 having a cylindrical-surfaced lens 33 formed on a first end of the second laser illuminator 32 for projecting a laser light line V perpendicular to the longitudinal axis H' of the disk 31 upon a depression of a switch 34 formed on a second end of the second laser illuminator 32, whereby upon an attraction of the disk 31 of the laser angle calibrator 3 on the vertical wall 23 of the laser level 2, the laser light line V as projected from the second laser illuminator 32 is rotatable to form a vertical plane Pv as shown in FIG. 2 to be projectively perpendicular to the horizontal laser ray or beam H as emitted from the first laser illuminator 28 of the laser level 2.

By rotating the laser level 2 on the platform 14 about axis 120 as shown in FIG. 3, the laser ray H will be moved to another point of numeral H1 to form a horizontal plane Ph defined between points H, H1 for calibrating a horizontal level.

So, the present invention may be widely used in related engineering works, such as: building construction, interior uphostery, mechanical manufacturing or processing, civil engineering works, or instrument technology.

Figure 7:
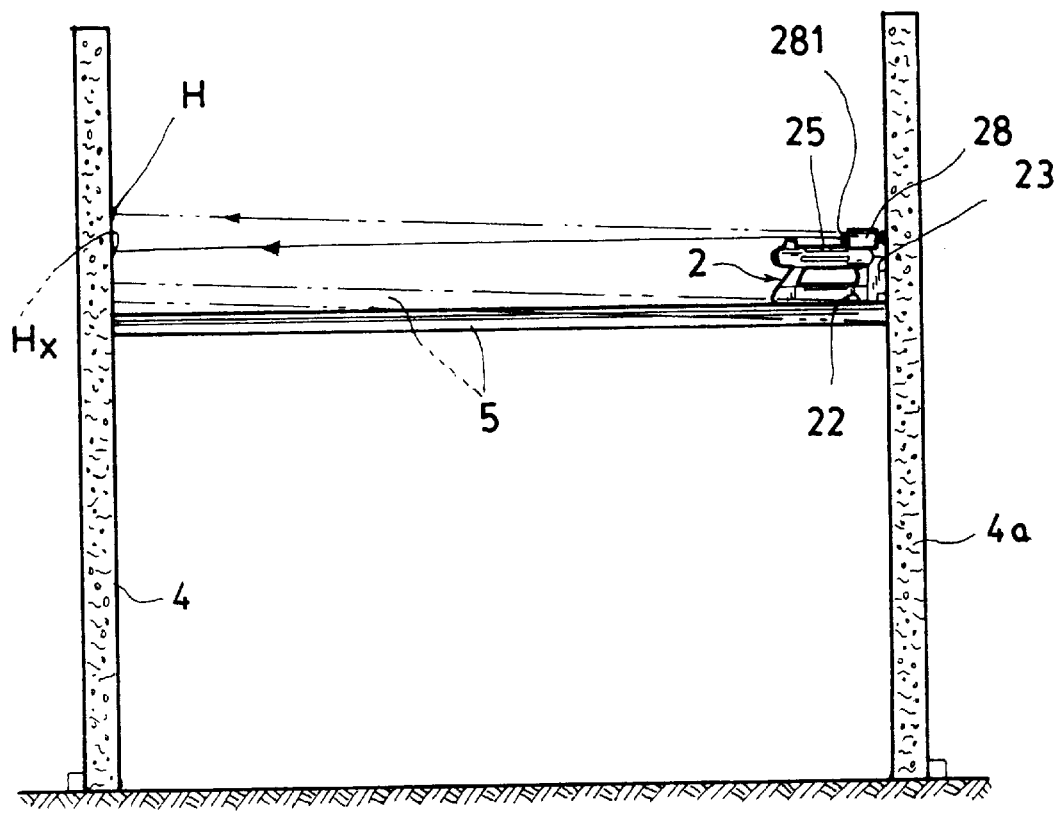
FIG. 7 is an illustration showing a levelling calibration by the laser level when installing an horizontal device.

As shown in FIG. 7 for installing a horizontal device 5 such as a horizontal shaft or plate between two vertical walls 4, 4a, the laser level 2 of the present invention may allow its vertical wall 23 to be attracted on a vertical wall 4a and allow its horizontal bottom 22 on the device 5. Upon emitting a horizontal light "point" at the vertical wall 4 by the laser illuminator 28 of the laser level 2 ridden on the device 5, the true horizontal plane may be obtained by matching the point Hx under testing or trial with the true horizontal point H which is previously calibrated and marked on the wall 4.

Figure 6:
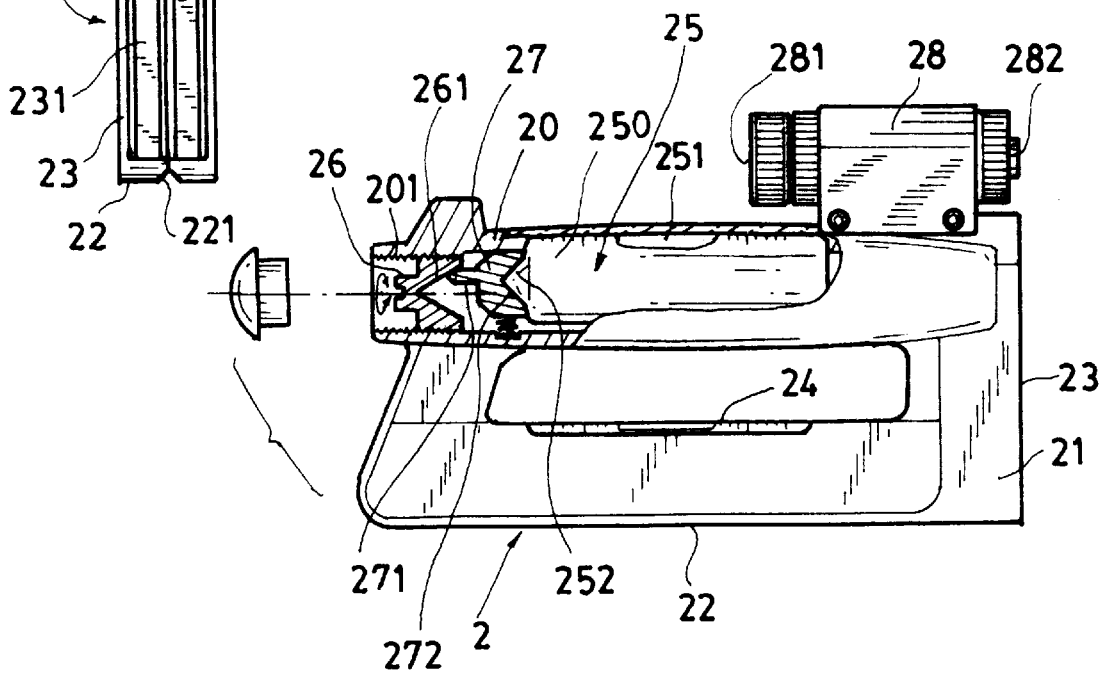
FIG. 6 is a partial cut-away illustration of the laser level of the present invention.

The adjusting bubble levelling means 25 as shown in FIG. 6 includes: a bubble tube 250 generally horizontally held in the hollow tube portion 20 in the body 21 of the laser level 2; an adjusting screw 26 having male threads engageable with a female-threaded hole 201 formed in the hollow tube portion 20 and having a conical recess 261 recessed in an inner end portion of the adjusting screw 26; a follower sleeve 27 resiliently held in the hollow tube portion 20 and having a thrusting stem 271 eccentrically formed on an outer end portion of the follower sleeve 27 to contact the conical recess 261 in the adjusting screw 26 and having a conical recess 272 recessed in an inner end of the follower sleeve 27 for engaging a conical head portion 252 formed on an outer free end of the bubble tube 250 having an inner tube end of the bubble tube 250 held in an innermost end portion in the hollow tube portion 20, whereby upon a rotation of the adjusting screw 26 to allow the conical recess 261 of the adjusting screw 26 to thrust the thrusting stem 271 of the follower sleeve 27 either upwardly or downwardly in the hollow tube portion 20 for biasing the free end of the bubble tube 250 for adjusting the bubble positioning in the bubble tube 250 for calibrating a levelling of the adjusting bubble levelling means 25 in order for obtaining a datum horizontal plane.

Figure 8:
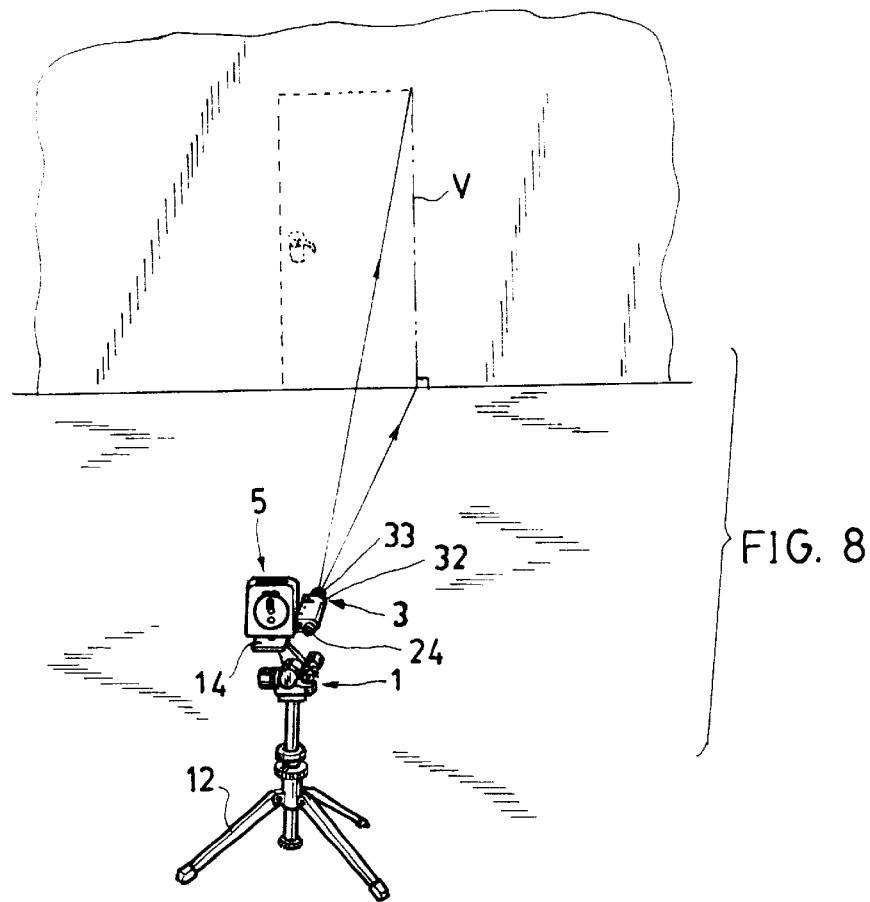
FIG. 8 is an illustration showing a verticality calibration by the laser angle calibrator when magnetically attracted on an angular level attracted on a stand.
Figure 10:
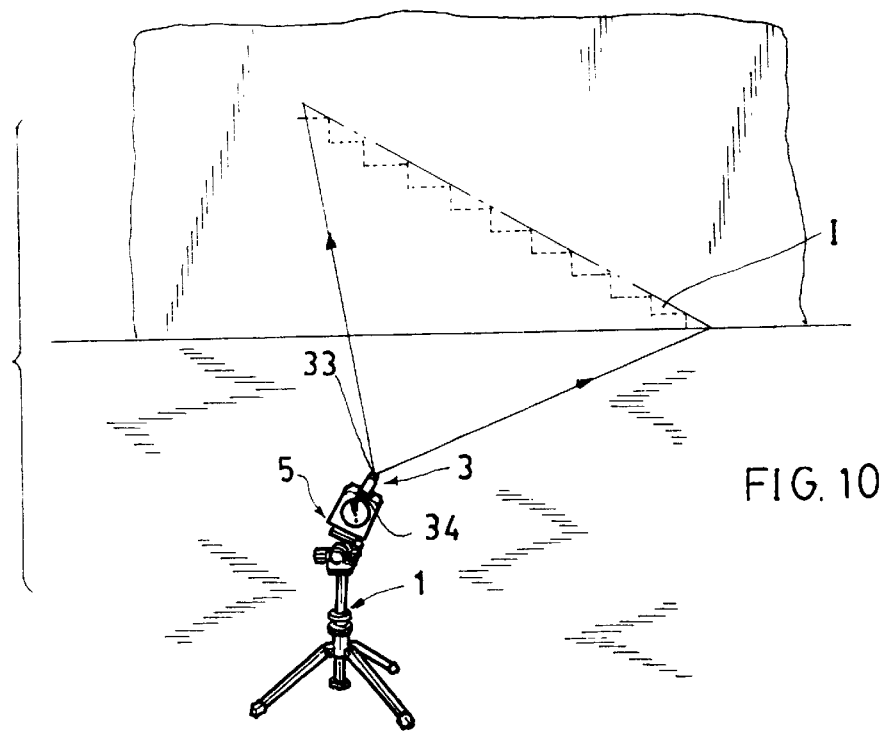
FIG. 10 is an illustration showing a calibration of an inclined angle by the laser angle calibrator on the angular level.
Figure 9:
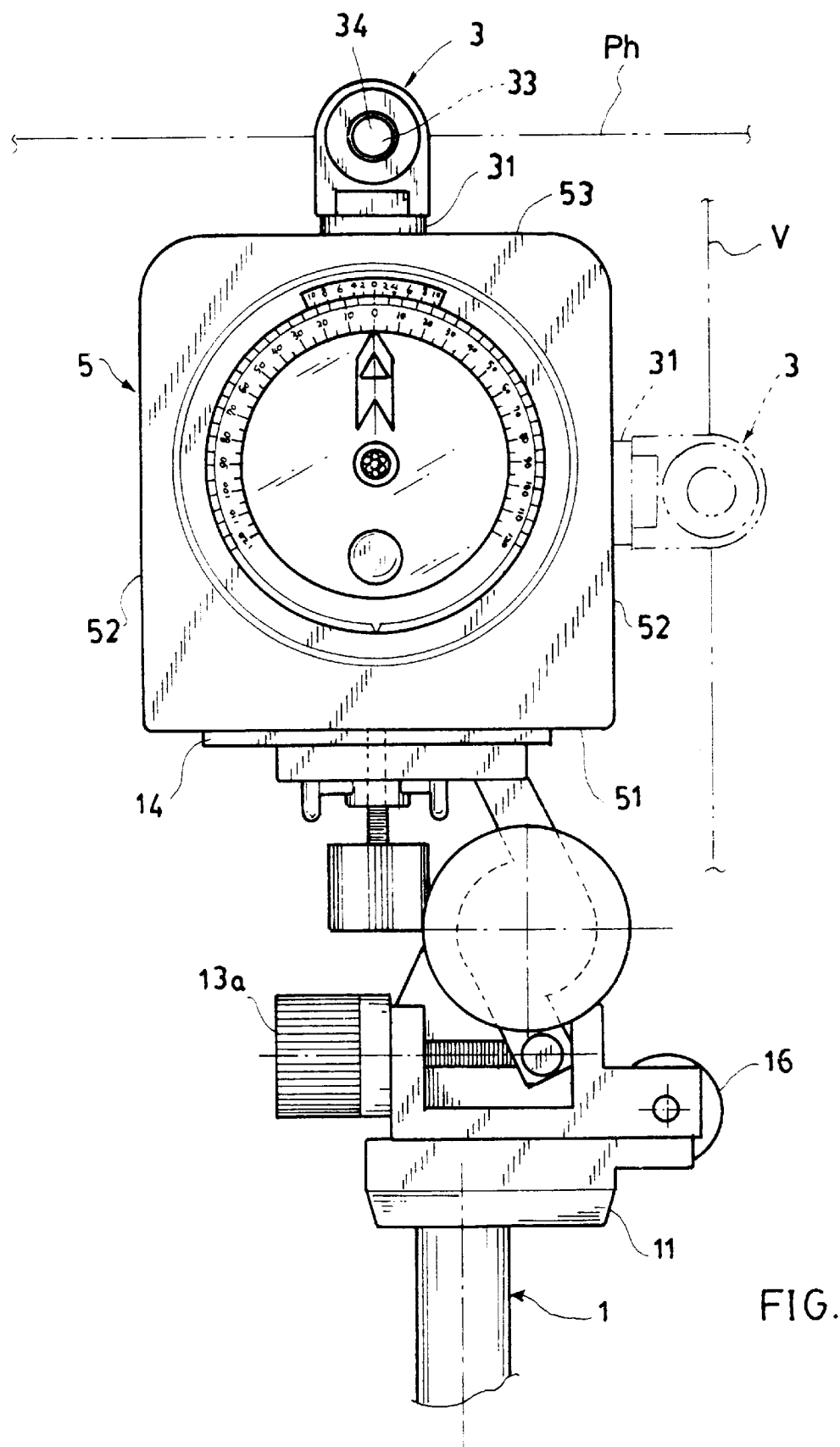
FIG. 9 is an enlarged view from FIG. 8.
Figure 11:
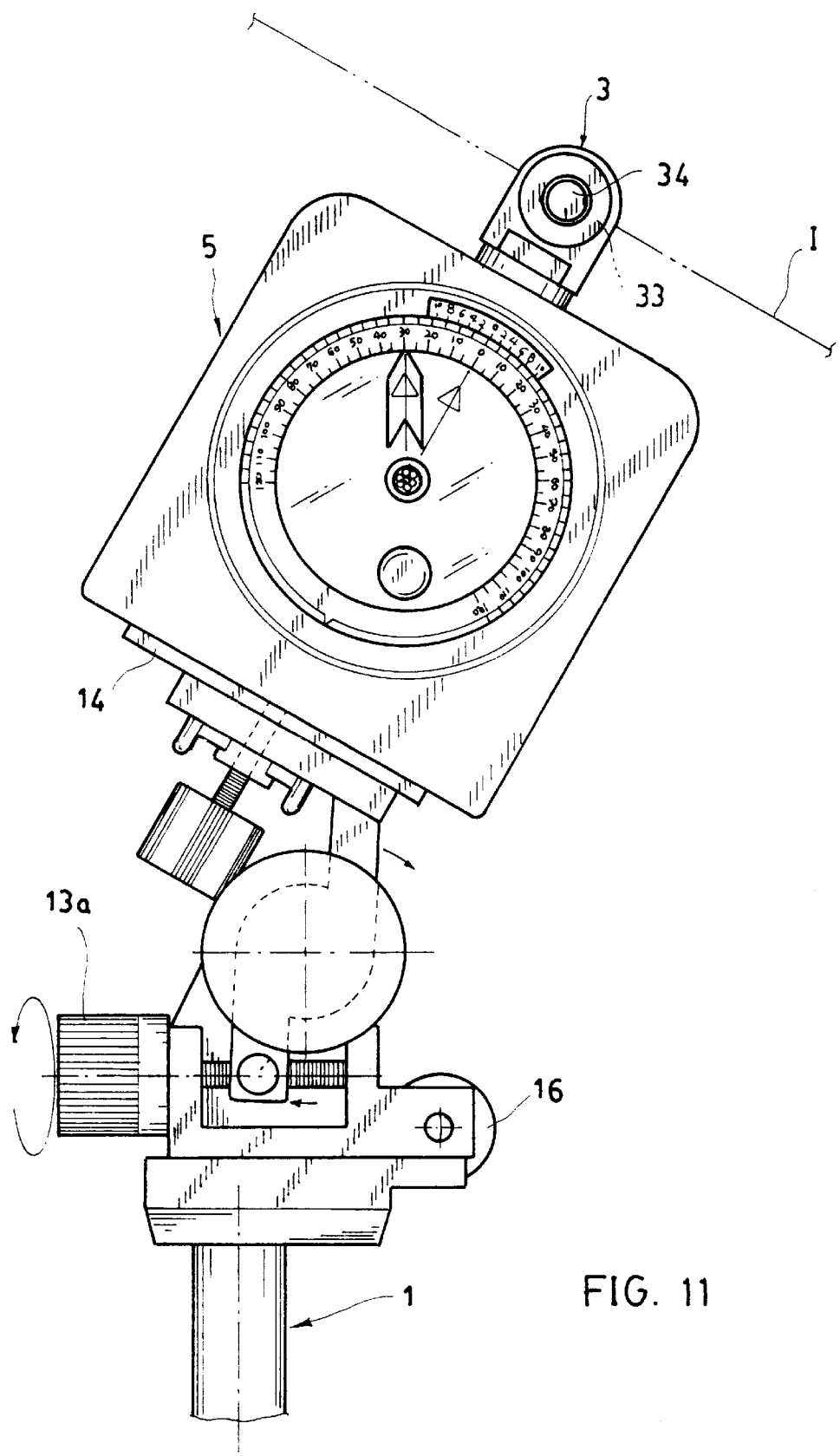
FIG. 11 is an enlarged view from FIG. 10.

As shown in FIGS. 8, 9, the magnetically attractive laser angle calibrator 3 may be attracted on a vertical side 52 or 53 of an angular level 5 which is disclosed in U.S. Pat. No. 4,656,752 also invented by the present inventor and includes a magnetic bottom side 51 of a rectangular shape magnetically attracted on the platform 14 of the stand 1, two vertical sides 52, 52 respectively perpendicular to the bottom side 51 having ferrous-material strip formed on each vertical side 52 for attracting the magnetically attractive laser angle calibrator 3 thereon, and an upper side 53 parallel to the bottom side 51 having ferrous-material strip formed on the upper side 53 for attracting the laser angle calibrator 3 thereon, thereby porjecting a vertical laser light line V or horizonal line Ph for checking verticality or horizon. The stand 1 further includes an adjusting knob 13a for adjusting a tilting angle of the platform 14 in order for forming a sloping angle of the angular level 5 as shown in FIGS. 10, 11 for projecting an inclined laser line I such as for building a staircase (FIG. 10). On the stand 1, there is further provided with another adjusting knob 16 for adjusting a rightward or leftward rotation of the rotational holder 11 on the stand 1 for changing the laser light projecting directions.

Figure 12:
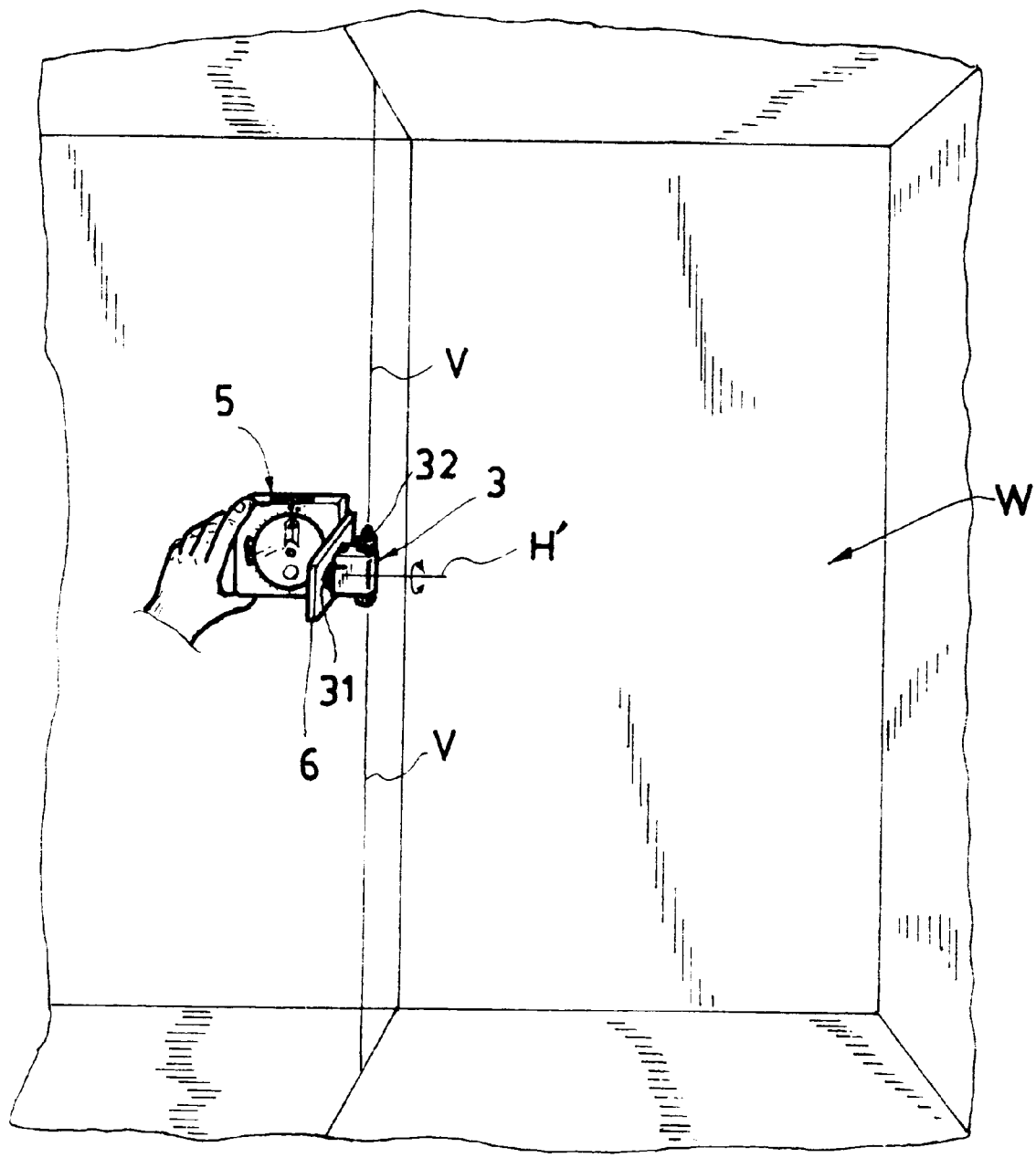
FIG. 12 shows another verticality calibration work when held on a user's hand.

The magnetically attractive laser angle calibrator 3 may be attracted on a square plate 6 as shown in FIG. 12, with the plate 6 perpendicularly attracted on a side of the angular level 5 of rectangular shape indicating 90 degrees angle so that the square plate 6 (made of ferrous material) is vertically erected with the angular level 5 rested on a vertical wall W, whereby upon a rotation of the disk 31 of the laser angle calibrator 3 about the axis H', a vertical laser light line V as projected from the laser illuminator 32 will form a vertical plane perpendicular to the wall W for calibrating verticality.

The laser angle calibrator 3 as attracted on the angular level 5 may be used for calibrating a verticality, a horizon or any tilting angles, not limited in the present invention.

Accordingly, the laser level 2 and the laser angle calibrator 3 of the present invention can be simultaneously held on the stand for checking the horizontal plane and the verticality. However, either the laser level 2 or the laser angle calibrator 3 may be individually independently used for levelling or angle calibrating purposes such as shown in FIGS. 7, and 8–12.

The present invention may be modified without departing from the spirit and scope of the present invention.

I claim:

1. A laser levelling and angle-calibrating instrument comprising: a stand (1); a magnetically attractive laser level (2) including: a level body (21) having a horizontal bottom (22) and a magnet (221) fixed in a V-shaped groove formed in the horizontal bottom (22), a vertical wall (23) formed on a side wall of the body (21) and being perpendicular to the horizontal bottom (22) and having a magnet (231) fixed in the vertical wall (23) for attracting magnetically attractive laser angle calibrator (3) on the vertical wall (23), a lower bubble levelling means (24) mounted in a lower portion of the body (21) for indicating a horizon of the laser level (2), an adjustable bubble levelling means (25) mounted in a hollow tube portion (20) formed on an upper portion of the body (21) for obtaining a reference datum horizonal plane of the horizontal bottom (22) and for obtaining a relative vertical plane of the vertical wall (23) with respect to the horizontal bottom (22), and a first laser illuminator (28) mounted on the body (21) for emitting a horizontal laser ray (H) when said laser level (2) is laid on a horizontal surface; and the magnetically attractive laser angle calibrator (3) including: a magnetic disk (31) having a magnet (311) fixed in the disk (31) to be magnetically attracted to the vertical wall (23) of the laser level (2) and having a flat disk bottom (310) coplanar to the vertical wall (23) and perpendicular to the horizontal bottom (22) of the laser level (2), a longitudinal axis (H') defined at a longitudinal center of the disk (31) and perpendicular to the vertical wall (23) of the laser level (2), a second laser illuminator (32) secured on the disk (31) having a cylindrical-surfaced lens (33) formed on a first end of the second laser illuminator (32) for projecting a laser light line (V) protectively perpendicular to the longitudinal axis (H') of the disk (31), whereby upon an attraction of the disk (31) of the laser anale calibrator (3) on the vertical wall (23) of the laser level (2), the laser light line (V) as projected from the second laser illuminator (32) is rotatable to form a vertical plane (Pv) to be protectively perpendicular to the horizontal laser ray (H) as emitted from the first laser illuminator (28) of the laser level (2).

2. A laser levelling and angle-calibrating instrument according to claim 1, wherein said adjusting bubble levelling means (25) includes: a bubble tube (250) generally horizontally held in the hollow tube portion (20) in the body (21) of the laser level (2); an adjusting screw (26) engageable in the hollow tube portion (20) and having a conical recess (261) recessed in an inner end portion of the adjusting screw (26); a follower sleeve (27) resiliently held in the hollow tube portion (20) and having a thrusting stem (271) eccentrically formed on an outer end portion of the follower sleeve (27) to contact the conical recess (261) in the adjusting screw (26) and having a conical recess (272) recessed in an inner end of the follower sleeve (27) for engaging a conical head portion (252) formed on an outer free end of the bubble tube (250) having an inner tube end of the bubble tube (250) held in an innermost end portion in the hollow tube portion (20), whereby upon a rotation of the adjusting screw (26) to allow the conical recess (261) of the adjusting screw (26) to thrust the thrusting stem (271) of the follower sleeve (27) upwardly and downwardly in the hollow tube portion (20) for biasing the free end of the bubble tube (250) for adjusting a bubble positioning in the bubble tube (250) for calibrating a levelling of the adjusting bubble levelling means (25) in order for obtaining a datum horizontal plane.

\* \* \* \* \*